Nov. 9, 1943.                J. B. FELLABAUM                    2,333,853
                           TRANSPORTATION VEHICLE
                            Filed Aug. 18, 1941              3 Sheets-Sheet 2
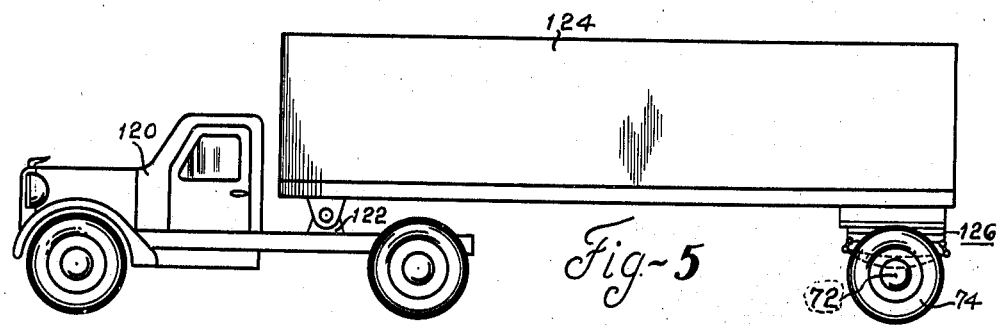
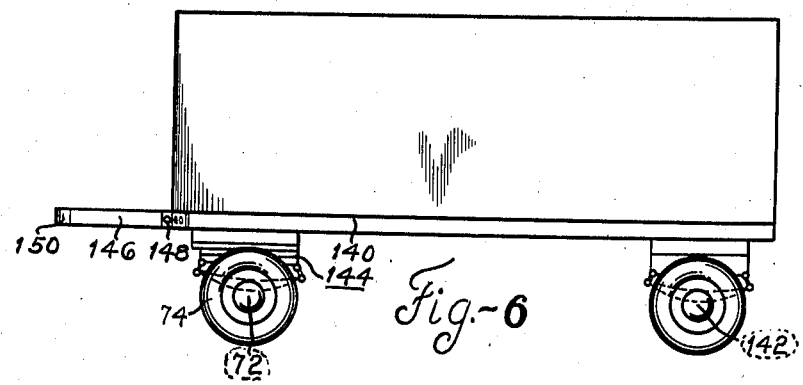
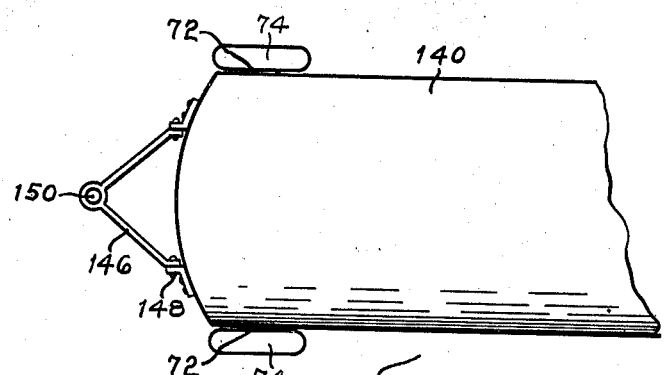
INVENTOR
John B. Fellabaum
By Henry G. Dybvig
HIS ATTORNEY Nov. 9, 1943. J. B. FELLABAUM 2,333,853
TRANSPORTATION VEHICLE
Filed Aug. 18, 1941 3 Sheets-Sheet 3
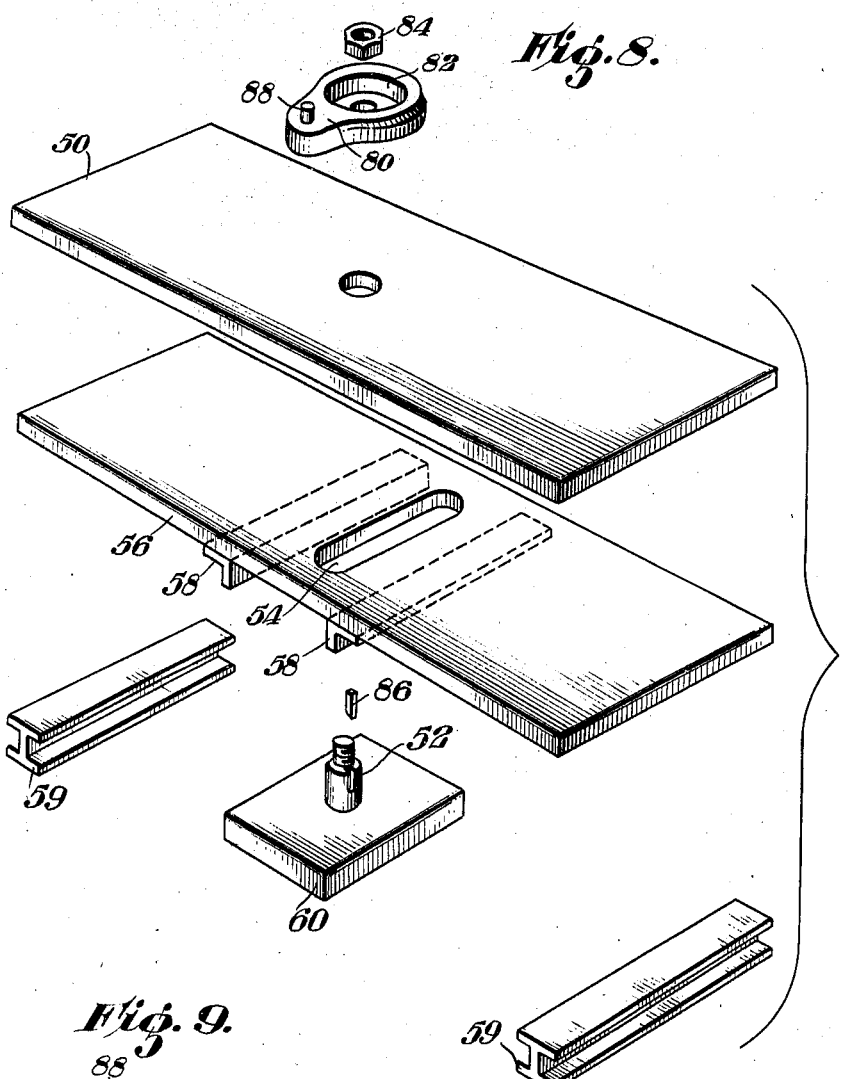
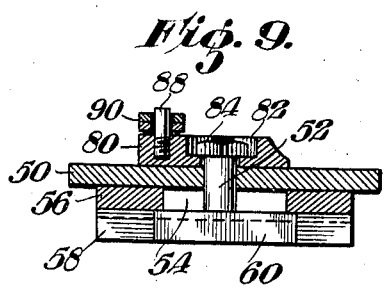

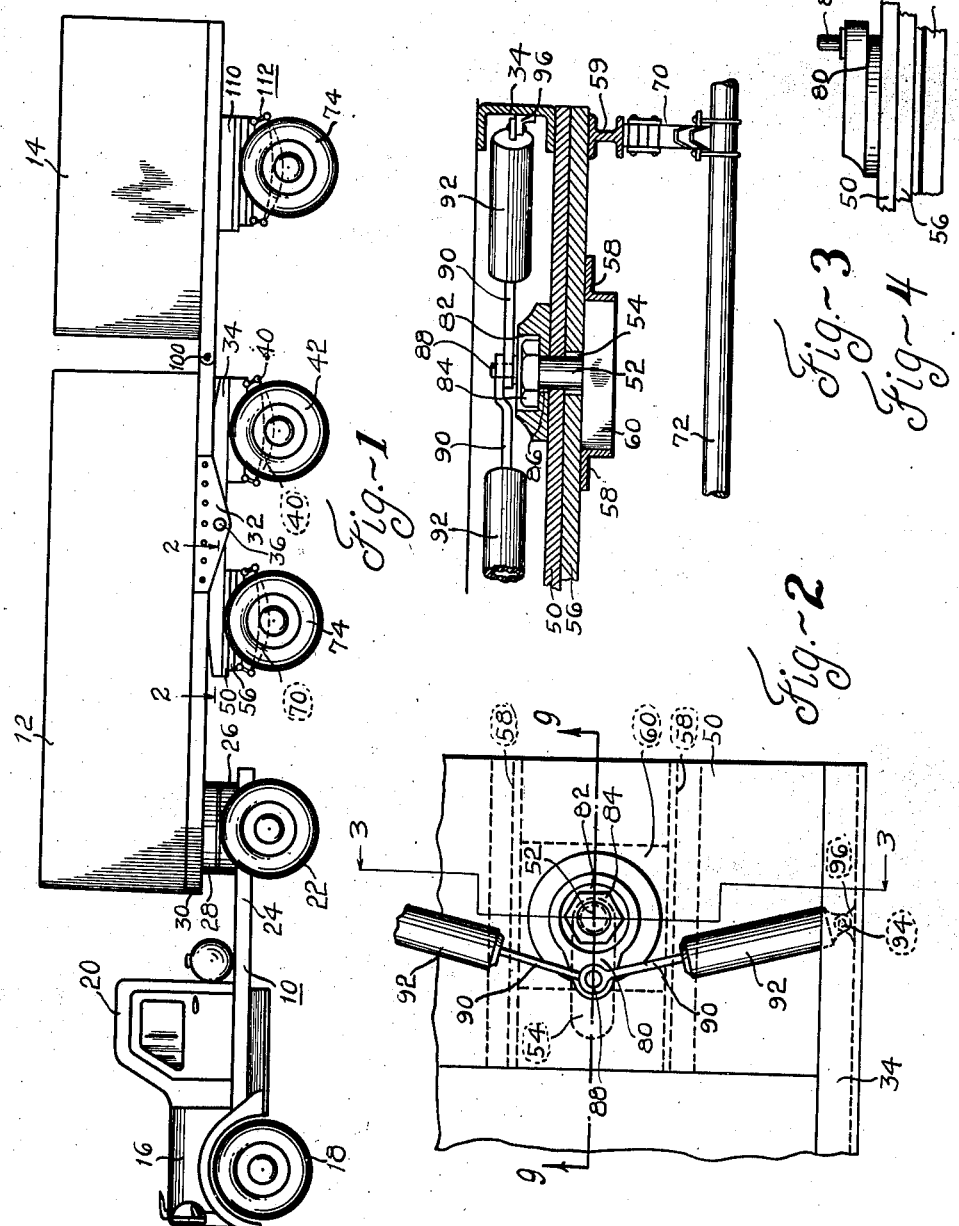

Patented Nov. 9, 1943

2,333,853

UNITED STATES PATENT OFFICE 2,333,853

TRANSPORTATION VEHICLE

John B. Fellabaum, Dayton, Ohio

Application August 18, 1941, Serial No. 407,294

16 Claims. (Cl. 280—33.2)

This invention relates to a transportation vehicle and more particularly to a vehicle provided with caster-trucks.

In transporting freight and other cargoes over the highways or elsewhere, it is very desirable to utilize equipment to the greatest advantage. Many of the freight haulers and trucking companies use a tractor and a trailer or a semi-trailer or a tandem trailer and various combinations thereof. Limitations are placed upon the size, the type and the maximum loads that may be carried. For example, a limitation is placed upon the load that may be carried upon a single axle, which load is influenced by the proximity of other axles. With this thought in mind, there has been a tendency to lengthen the loads by the use of trailers and semi-trailers connected in tandem. However, these have limitations caused by traffic hazards, resulting in traffic regulations. Furthermore, they have definite limitations in that difficulty is experienced in backing these various trailer arrangements.

An object of this invention is to provide a motor vehicle consisting of several units wherein the maximum load may be carried economically.

Another object of this invention is to provide a composite vehicle for transportation wherein the vehicle may be easily controlled in traffic.

Another object of this invention is to provide a support for some of the units of the composite vehicle, wherein these units are mounted for swinging movement about a vertical axis, which vertical axis is located ahead of the axle of the unit, as measured relative to the direction of movement.

Another object of this invention is to provide an articulated transportation vehicle, wherein at least two of the units are arranged in a substantially straight line at all times.

Other objects and advantages reside in the construction of parts, the combination thereof and the mode of operation, as will become more apparent from the following description.

In the drawings, Figure 1 is a side elevational view of an articulated motor tractor and truck-trailer assembly.

Figure 2 is a fragmentary top plan view taken substantially on the line 2—2 of Figure 1.

Figure 3 is a transverse, cross sectional view taken substantially on the line 3—3 of Figure 2.

Figure 4 is a fragmentary, side elevational view of the controlling portion of the caster-truck.

Figure 5 discloses a side elevational view of a modification of a semi-trailer attached to a tractor.

Figure 6 discloses another modification showing a side elevational view of a truck adapted to be towed by a tongue, which truck is provided with a pair of wheels mounted on a fixed axle and a pair of caster-trucks.

Figure 7 is a top plan view of the modification disclosed in Figure 6.

Figure 8 is an exploded view showing a stationary plate, a reciprocatory and oscillatory plate, together with the pivotal connections used in the caster-truck assembly, without showing the springs, axle and wheels of the caster-truck.

Figure 9 is a cross sectional view of the caster-truck parts shown in Figure 8 and taken substantially on the line 9—9 of Figure 2.

"Caster-truck," as used herein, designates wheels which turn with or about an axle held in a frame which itself turns on a pivot or vertical spindle placed at a considerable distance in front of the bearing line of the faces of the wheels, a construction which enables the wheels to swerve readily through 180° to either side of the line of draft. The "bearing line," as here used, is a line on the ground directly below and parallel to the axis of the wheels.

The use of caster-trucks in connection with trailers and trucks permits the equalization of the load on the several axles and groups of wheels to thereby obtain the greatest efficiency in transportation, consistent with traffic regulations governing the operation of trucks. Furthermore, caster-trucks may be used in any arrangement with a pair of wheels mounted on a fixed axle, whether the wheels be mounted on the tractor, on the trailer, on the trailer truck or any other unit associated with the transportation vehicle. Such caster-trucks may be mounted ahead of the fixed axle or to the rear or both, so as to be mounted under the load to support part or all of the weight thereof, and to expedite the manipulation of the truck in traffic and in spotting the truck both for loading and unloading.

In the past a motor vehicle has been proposed wherein auxiliary wheels are provided to carry a small portion of the weight; but these auxiliary wheels are definitely limited in their oscillatory movement, which may be satisfactory when these wheels are used on the tractor or the motor vehicle provided with steering wheels. However, this arrangement would not be feasible for use on trailers and trucks towed by a tractor, in that the auxiliary wheels could not accommodate "jack-knifing positions" of the tractor with respect to the truck and/or trailers. The present use of tractors permits the turning of the truck or the trailer within its own space. The truck is controlled through a distance equal to a radius extending from the wheels mounted on a fixed axle to the pivotal connection of the truck to the tractor. Such a prior art device is definitely limited in swinging movement to a degree substantially equal to the turning movement of the tractor provided with steering wheels; but cannot be used in turning a truck in a smaller space. Such trucks having a limited swinging movement are not practical for use in trucks and trailers adapted to be towed by a tractor.

Referring to the drawings, the tractor 10 is used to supply power and support part of the weight of the load that may be hauled in a truck 12 partaking the nature of a trailer, having connected thereto a trailer 14. Either the truck 12 or the trailer 14 may be referred to as a load carrying transportation unit drawn by a motorized tractor. The term "truck," as used herein, designates a load carrying vehicle with all or part of the power supplied from a separate power unit. The tractor 10 may be provided with any suitable type of engine located under the hood 16, such as a Diesel engine, gasoline engine, oil burning engine or an electric motor.

The wheels 18 are used in steering the tractor and are controlled by a steering wheel actuated by a driver seated in the cab 20. The wheels 22 form the drive wheels. These are driven from the motor through any suitable transmission device. The chassis 24 of the tractor supports a fifth wheel assembly including one member 26 mounted on the tractor and a second member 28 mounted on the chassis 30 of the truck 12. Members 26 and 28 are pivotally attached about a vertically disposed pivot forming a swivel, as is well known to those skilled in the art.

The rear end of the truck or trailer 12 has mounted thereon a pair of rigid brackets 32 supporting a truck assembly including a pair of channel beams or frame members 34, forming the chassis of a sub-truck. The channel beams 34 are pivotally mounted at 36 about a horizontally disposed pivot. This permits oscillatory movement of the beams 34 with respect to the load, so as to take care of unevenness in the traveling surface, as will appear more fully later.

The rear ends of the channel beams 34 support a suitable leaf spring 40 mounted on a fixed axle for the wheels 42. A pair of wheels may be used, or if the load is too heavy for one pair, two or three wheels may be used on each end of the axle, as is well known to those skilled in the art.

The front ends of the channel beams 34, as viewed in Figure 1, are mounted on a caster-truck assembly. This caster-truck assembly includes a plate 50 fixedly attached to the channels 34 by rivets, spot welding or in any other suitable manner. In the center of the plate 50 is located an aperture receiving a king bolt 52. The king bolt extends through a slot 54 in a floating plate 56. The lower end of the king bolt 52 terminates in a square or rectangular head 60 having faces abutting the under side of the plate 56 and the edges guided by a pair of angle irons or guides 58, one on either side of the slot 54. The angle irons or guides 58 extend parallel to the slot and cooperate with the edges of the square head 60 of the king bolt to prevent rotation thereof, unless the plate 56 also rotates, in which event the king bolt rotates with this plate. The plate 56 supports beams 59 having attached thereto springs 70. The ends of the springs are attached to the plate by suitable spring shackles. The springs support an axle 72, having mounted thereon a pair of wheels 74. Instead of a pair of wheels, there may be two wheels on each end, or there may be more, depending upon the load and the nature of the vehicle.

When the tractor exerts a forward draft on the truck 12, the king bolt remains stationary in the plate 50; but the plate 56 slides rearwardly, so as to cause the king bolt 52 to be seated in the front end of the slot 54. By this arrangement, it can readily be seen that the axle 72 is located to the rear of the king bolt 52 measured in the direction of draft. Thus, the wheels 74, together with the axle 72, the plate 56, the guides 58, et cetera, swerve sidewards whenever the direction of movement is changed, so as to cause the wheels at all times to be substantially parallel to the line of draft as exerted upon the caster-trucks by the king bolt. If it is found desirable to reverse the vehicle, the caster-truck need not necessarily rotate through 180°, in that the wheels 74, the axle 72, together with the plate 56, slide relative to the king bolt 52, so as to shift these parts relative to the king bolt from one end of the slot 54 to the opposite end. Again, the axle and the wheels are located to the rear of the king bolt, measured in the direction of draft, which is reversed from the forward direction.

In the absence of a restraining force, the axle 72 and the parts carried thereby would readily swerve if the wheels on one side were to hit a small obstruction, bump or irregularity in the traveling surface. A dash pot control mechanism, which will now be described, is used to overcome sudden impacts. The upper end of the king bolt has keyed thereto a crank arm 80. This crank arm is provided with a recess 82 receiving a nut 84 threadedly engaging the upper end of the king bolt 52. A suitable key 86 prevents rotation of the crank arm 80 with respect to the king bolt, so that as the king bolt rotates, caused by the swerving of the wheels, the crank arm 80 rotates. The general direction of the crank arm 80 is normal to the longitudinal axle 72, so that when the wheels 74 are aligned with the wheels 42, the crank arm 80 extends in a direction parallel to the longitudinal direction of the truck. This crank arm 80 carries a crank pin 88, having mounted thereon a pair of piston rods 90 supporting suitable pistons, not shown, positioned in the dash pots 92, pivotally mounted at 94 on suitable brackets 96 located in the channels 34. These dash pots are arranged to normally hold the crank arm 80 aligned with the longitudinal axis of the truck. However, the dash pot arrangement does not preclude rotation or swerving of the wheels about the king bolt 52. As a matter of fact, the crank arm 80 is free to swing through 180° against the force exerted by the dash pots if the manipulation of the truck should warrant such a rotation.

In addition to the truck 12, the articulated transportation vehicle assembly shown in Figure 1 includes a trailer 14. The trailer 14 is attached to the truck 12 by a horizontal pivot or hinge arrangement including the pivots 100, one on either side of the trailer and the truck. This arrangement causes the trailer 14 to be aligned with the truck 12 at all times. In order to support the weight of the trailer 14, this trailer has been mounted upon a suitable block 110 supporting a caster-truck 112 that is identical to the caster-truck including the axle 72, the wheels 74 and the parts associated therewith, as described in connection with the truck 12. In the event the trailer 14 swerves to the right or the left in response to a change of direction of the truck 12 towed by the tractor 10, the caster-truck 112 will swerve, so as to permit the trailer 14 to swing to either side, so that the body of the trailer 14 is always in alignment with the body of the truck 12. The direction of the movement of the truck 12 and the trailer 14 is governed by the relative direction of movement of the tractor 10 with respect to the direction of the wheels 42 which are mounted upon a fixed axle relative to the truck 12, excepting for the yielding of the springs 40.

If the tractor is caused to change its direction to the left, the part of the assembly to the rear of the wheel 42 will swing to the right, that is, the trailer 14 swings outwardly in a direction opposite to the direction of the swinging movement of the truck, acute to the line of draft of the tractor. This articulated assembly is so constructed and arranged that the tractor may "jack-knife" with respect to the truck 12 and the trailer 14 about the pivot found in the fifth wheel, including members 26 and 28. There is no jack-knifing effect laterally, as far as the relative position of the truck 12 with respect to the trailer 14 is concerned. By the arrangement of the wheels shown, it is possible to arrange the distance between the axles so as to uniformly divide the load and so as to have a uniform distance between the several axles. By utilizing a caster-truck or trucks, either in front or behind the fixed wheels 42, or both in front and behind, it is possible to maintain absolute control of the articulated transportation assembly in traffic, in taking corners or curves and in backing.

The combination need not necessarily consist of a tractor 10, a truck 12 and a trailer 14. Referring to the modification disclosed in Figure 5, a tractor 120 is provided with a pair of upwardly directed brackets 122 hingedly supporting a trailer 124, identical in structure to the trailer 14, excepting that in this modification the trailer 124 has the caster-truck 126 located near the rear end of the trailer 124. The trailer 124 is always aligned with the tractor 120 so that when the tractor turns, the trailer 124 swings with it. The caster-truck 126 is identical to the caster-trucks described in connection with the preferred embodiment. The caster-truck being located near the rear causes part of the load of the trailer to be supported by the rear end of the tractor 120, to thereby increase the traction of the drive wheels of the tractor.

Instead of having a fixed axle under the truck 12, the truck 12 and the trailer 14 could be supported exclusively upon caster-trucks, in which event the fixed axle on the tractor, cooperating with the steering wheels, would govern the movement of the transportation unit. In that event, it would be necessary to utilize a horizontal pivot arrangement or hinge arrangement for interconnecting the truck 12 and the tractor 10. The use of caster-trucks is dependent upon the use of one fixed axle, having wheels mounted thereon controlling the alignment of the chassis mounted on the caster-trucks, irrespective of where this fixed axle may be mounted, whether on the tractor, on the truck towed by the tractor, or on the trailer.

In the modification disclosed in Figures 6 and 7, another type of truck assembly has been shown. In this truck assembly the chassis 140 supports a fixed axle 142 near one end thereof and a caster-truck assembly 144 near the opposite end thereof, which caster-truck assembly may be identical to the ones previously described. The forward end of the chassis 140 has pivotally attached thereto a wishbone tongue 146 pivotally mounted about the horizontal pivot 148 and terminating in a pivot 150 at the apex of the wishbone. This pivot 150 is adapted to be connected to a motivating vehicle. This motivating vehicle may be a truck or a trailer, or it may be a tractor. For example, the modification disclosed in Figures 6 and 7 could be connected or coupled to the rear of the trailer 124, disclosed in Figure 5. Such an assembly would at all times be under the control of the driver, whether the assembly travels forward or is driven in reverse.

In the modification disclosed in Figures 6 and 7, the arrangement of the caster-truck and the fixed axle 142 could be reversed, that is, the fixed axle could be mounted at the front and the caster-truck at the rear. Furthermore, the fixed axle could be eliminated in its entirety, providing the pivotal connection between the truck 140 and the motivating vehicle—whether it be a tractor or some type of a trailer unit connected to the tractor—be attached by the use of a horizontal hinge connection, so as to cause the body of the truck 140 and the motivating vehicle to be aligned in a vertical plane. This hinge connection, of course, would require a double hinge connection, so as to take care of unevenness in the surface traversed.

In the preferred embodiment and each of the modifications, suitable brakes may be provided for the wheels so as to apply the brakes to the caster-trucks, as well as the other wheels. This may be accomplished by the use of mechanical, electrical, hydraulic, vacuum or air brakes. The motivating force, irrespective of the nature of the brakes, may be supplied to the brakes on the individual wheels through the king bolt. The brake system has not been shown herein for the reason that this may form the subject matter of a separate application.

The above described preferred embodiment and several modifications have merely been shown for the purpose of illustration. Instead of utilizing a longitudinal slot that is straight, a curved or irregular shaped slot could be used. The slot may be dispensed with and the pivots supported upon suitable links or arms having a fore and aft position, or the frame of the caster-truck could be mounted for pivotal attachment in two positions, one a fore position used in driving forward, and one an aft position used in reverse. The same result may be obtained by providing sliding supports or lost motion connection between the springs supporting the axle and the vehicle. These are details any of which may be utilized to carry out the use of a caster-truck that may rotate about a pivot offset with respect to the axis joining the wheels.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:
1. A transportation assembly including a tractor having a pair of steering wheels and a pair of driving wheels, a semitruck, means for interconnecting the front end of the truck to the tractor, said means forming a swivel connection between the tractor and the truck allowing the truck to oscillate about a vertically disposed pivot, said truck including a sub-truck pivotally attached to the aforementioned truck so as to support part of the load, said sub-truck including a frame, a pair of supporting wheels and an axle therefor, said axle being non-rotatably attached to one end of said frame, and a caster-truck, means for interconnecting the caster-truck to the other end of the frame, said last mentioned means including a vertically disposed pivot, said caster-truck including wheels which turn about an axle held in a frame which itself turns on said vertical pivot placed a considerable distance in front of the bearing line of the faces of the wheels, which frame permits the wheels to swerve readily through 180° to either side of the line of draft, said interconnecting means permitting a longitudinal movement between the frame of the caster-truck and the pivot so as to permit the axis of the wheels of the caster-truck to shift from one side of the pivot to the opposite side of the pivot without rotating the frame through 180°.

2. A transportation assembly including a tractor having a pair of steering wheels and a pair of driving wheels, a trailer assembly, and means for interconnecting the front end of the trailer assembly to the tractor, said means forming a flexible coupling between the tractor and the trailer assembly, said trailer assembly including a caster-truck for supporting at least a part of the load, said caster-truck including wheels which turn about an axle held in a frame which itself turns on a vertical pivot placed a considerable distance in front of the bearing line of the faces of the wheels, which frame permits the wheels to swerve readily through 180° to either side of the line of draft, the frame of the caster-truck having a longitudinal sliding movement with respect to the pivot so as to shift the relative position of the axle of the caster-truck from one side of the pivot to the opposite side of the pivot without rotating the frame through 180°.

3. A transportation assembly including a tractor, a fifth wheel member mounted on the tractor, a load carrying transportation unit including a second fifth wheel member cooperating with the first fifth wheel member to form a pivotal interconnection for swinging movement about a vertical pivot disposed intermediate the tractor and the load carrying transportation unit, said load carrying transportation unit including a caster-truck for supporting part of the load of the load carrying transportation unit, said caster-truck including wheels which turn about an axle held in a frame which itself turns on a vertical pivot placed a considerable distance in front of the bearing line of the faces of the wheels, which frame permits the wheels to swerve readily through 180° to either side of the line of draft, the frame of the caster-truck having a longitudinal sliding movement with respect to the pivot so as to shift the relative position of the axle of the caster-truck from one side of the pivot to the opposite side of the pivot without rotating the frame through 180°.

4. A transportation assembly including a motorized tractor, a load carrying transportation unit, means for pivotally interconnecting the tractor to the load carrying transportation unit, said load carrying transportation unit including a caster-truck for supporting part of the load of the load carrying transportation unit, said caster-truck including wheels which turn about an axle held in a frame which itself turns on a vertical pivot placed a considerable distance in front of the bearing line of the faces of the wheels, which frame permits the wheels to swerve readily through 180° to either side of the line of draft, the frame of the caster-truck having a longitudinal sliding movement with respect to the pivot so as to shift the relative position of the axle of the caster-truck from one side of the pivot to the opposite side of the pivot without rotating the frame through 180°.

5. A transportation assembly including a motorized tractor and a load carrying transportation unit, flexible means for interconnecting the transportation unit to the tractor, said transportation unit including a load carrying axle, wheels for supporting said axle, and a caster-truck mounted intermediate the load carrying axle and the tractor, said caster-truck supporting a part of the load of the transportation unit, said caster-truck including wheels which turn about an axle held in a frame which itself turns on a vertical pivot placed a considerable distance in front of the bearing line of the faces of the wheels, which frame permits the wheels to swerve readily through 180° to either side of the line of draft, the frame of the caster-truck having a longitudinal sliding movement with respect to the pivot so as to shift the relative position of the axle of the caster-truck from one side of the pivot to the opposite side of the pivot without rotating the frame through 180°.

6. A transportation assembly including a motorized tractor and a load carrying transportation unit, flexible means for interconnecting the transportation unit to the tractor, said transportation unit including a chassis and a caster-truck for supporting part of the load, said caster-truck including wheels which turn about an axle held in a frame, means for interconnecting the frame and the chassis including a vertical pivot slidingly engaging the frame so that the pivot is placed a considerable distance in front of the bearing line of the faces of the wheels, which frame permits the wheels to swerve readily through 180° to either side of the line of draft, an axle mounted intermediate the caster-truck and the tractor, means for interconnecting the axle to the chassis of the transportation unit, and wheels rotatably mounted on the axle for supporting a part of the load of the transportation unit.

7. A transportation assembly including a motorized tractor and a load carrying transportation unit adapted to be drawn by the motorized tractor, flexible means for interconnecting the transportation unit to the tractor, said transportation unit including a load carrying axle, wheels for supporting said axle, and a caster-truck mounted intermediate the load carrying axle and the tractor, said caster-truck supporting a part of the load of the transportation unit, and a second caster-truck mounted to the rear of the load carrying axle for supporting a part of the load of the transportation unit, each of said caster-trucks including wheels which turn about an axle held in a frame which itself turns on a vertical pivot placed a considerable distance in front of the bearing line of the faces of the wheels, which frame permits the wheels to swerve readily through 180° to either side of the line of draft, and means for reversing the relative position of the pivot with respect to the frame, so as to shift the pivot from a position in front of the axle to a like position to the rear of the axle when reversing the direction of movement of the transportation unit to thereby eliminate the swerving of the axle through 180°.

8. A transportation assembly including a motorized tractor, a load carrying transportation unit adapted to be drawn by the motorized tractor and flexible means for interconnecting the load carrying transportation unit to the tractor, said load carrying transportation unit including a chassis, a caster-truck assembly mounted underneath the chassis, said caster-truck assembly including a fixed load carrying plate having an aperture in the center thereof, a king bolt extending through said aperture, a second plate underlying the first-mentioned plate, said second plate being provided with a longitudinal slot receiving the king bolt, an axle, means for attaching the axle to the second plate, said axle being located substantially underneath the longitudinal center of the slot, load carrying wheels journalled on the axle, said load carrying wheels together with the axle and the second plate causing the second plate to slide rearwardly with respect to the direction of draft to seat the king bolt in engagement with the forward end of the slot forming a pivot about which the second plate, the axle and the wheels may swerve to either side in response to changes in the direction of draft.

9. A transportation assembly including a motorized tractor, a load carrying transportation unit and flexible means for interconnecting the load carrying transportation unit to the tractor, said load carrying transportation unit including a chassis, a caster-truck assembly mounted underneath the chassis, said caster-truck assembly including a fixed load carrying plate having an aperture in the center thereof, a king bolt extending through said aperture, a second plate underlying the first-mentioned plate, said second plate being provided with a longitudinal slot receiving the king bolt, means for mounting load carrying wheels underneath said second plate, the longitudinal axis of the axle means about which said wheels rotate being aligned with and underlying the center of said slot, said load carrying wheels together with said second plate causing the second plate to slide rearwardly with respect to the direction of draft to seat the king bolt in engagement with the forward end of the slot forming a pivot about which said second plate and the wheels may swerve to either side in response to changes in the direction of draft, and means for resisting swerving movement of said second plate with respect to the first plate.

10. A transportation assembly including a motorized tractor, a load carrying transportation unit and flexible means for interconnecting the load carrying transportation unit to the tractor, said load carrying transportation unit including a chassis, a caster-truck assembly mounted underneath the chassis, said caster-truck assembly including a fixed load carrying plate having an aperture in the center thereof, a king bolt extending through said aperture, a second plate underlying the first-mentioned plate, said second plate being provided with a longitudinal slot receiving the king bolt, means for mounting load carrying wheels underneath said second plate, the longitudinal axis of the axle means about which said wheels rotate being aligned with and underlying the center of said slot, said load carrying wheels together with said second plate causing the second plate to slide rearwardly with respect to the direction of draft to seat the king bolt in engagement with the forward end of the slot forming a pivot about which said second plate and the wheels may swerve to either side in response to changes in the direction of draft, and means for resisting swerving movement of said second plate with respect to the first plate, said last mentioned means including guides for causing the king bolt to rotate with the second plate, a crank arm fixedly attached to the king bolt, and a dash pot assembly interconnected to the crank arm, said dash pot assembly tending to align the slot with respect to the longitudinal axis of the load carrying transportation unit.

11. A transportation assembly including a motorized tractor, a load carrying transportation unit and flexible means for interconnecting the load carrying transportation unit to the tractor, said load carrying transportation unit including a chassis, a caster-truck assembly mounted underneath the chassis, said caster-truck assembly including a frame, an axle carried by the frame, load carrying wheels rotatably mounted on the axle, and pivotal means for interconnecting said frame to the chassis of the load carrying transportation unit, said pivot being located ahead of the axle in the direction of draft, said pivot permitting the frame and the wheels carried thereby to swerve through 180° about said pivot, said pivotal means cooperating with the caster-truck frame to permit an axial movement of the frame with respect to the pivot so as to shift the pivot with respect to said axle so as to adjust the pivot from one side of the axle to the opposite side of the axle in response to a reversal of the direction of movement.

12. A transportation assembly including a motorized tractor, a load carrying transportation unit and flexible means for interconnecting the load carrying transportation unit to the tractor, said load carrying transportation unit including a chassis, a caster-truck assembly mounted underneath the chassis, said caster-truck assembly including a frame, an axle carried by the frame, load carrying wheels rotatably mounted on the axle, and pivotal means for interconnecting said frame to the chassis of the load carrying transportation unit, said pivot being located ahead of the axle in the direction of draft, said pivot permitting the frame and the wheels carried thereby to swerve through 180° about said pivot, and means for restricting the free swerving movement of said frame and the wheels carried thereby, said means tending to align the axle normal to the longitudinal axis of the load carrying transportation unit.

13. A transportation assembly including a motorized tractor, a load carrying transportation unit and flexible means for interconnecting the load carrying transportation unit to the tractor, said load carrying transportation unit including a chassis, a caster-truck assembly mounted underneath the chassis, said caster-truck assembly including a pivotally mounted frame, a pivot attached to said chassis, adjustable means for interconnecting the pivot to the frame, said adjustable means permitting the frame to be adjusted longitudinally into two extreme positions, load carrying wheels, means for interconnecting the load carrying wheels with the axis of rotation offset to the rear in the direction of the line of draft when the pivot is in one position so as to permit the wheels to swerve in response to changes in the direction of the line of draft, said frame and the load carrying wheels being free to swerve through 180° said frame shifting with respect to the pivot to the opposite extreme position in response to a reversal in the direction of the line of draft so as to shift the pivotal connection from one side of the axis of rotation to the opposite side thereof.

14. A transportation assembly including a motorized tractor, a load carrying transportation unit and flexible means for interconnecting the load carrying transportation unit to the tractor, said load carrying transportation unit including a chassis, a caster-truck assembly mounted underneath the chassis, said caster-truck assembly including a pivotally mounted frame, load carrying wheels, means for interconnecting the load carrying wheels with the axis of rotation offset to the rear in the direction of the line of draft so as to permit the wheels to swerve in response to changes in the direction of the line of draft, said frame and the load carrying wheels being free to swerve through 180° so as to shift the relative position of the pivot with respect to said axis in response to a reversal in the direction of the line of draft, and dash pot means restricting the free swerving movement of the frame and the load carrying wheels.

15. A load carrying caster-truck assembly, said caster-truck assembly including a king bolt, means in which said king bolt is journalled, a frame, an axle, means for attaching the frame to the axle, said frame including a slot through which the king bolt projects, the axle extending normal to the longitudinal axis of the slot, and load carrying wheels journalled on said axle, said frame moving relative to the king bolt in response to movement of the king bolt so as to cause the king bolt to be seated in the forward end of the slot measured in the direction of draft.

16. A load carrying caster-truck assembly, said caster-truck assembly including a king bolt, means in which said king bolt is journalled, a frame, an axle, means for attaching the frame to the axle, said frame including a slot through which the king bolt projects, the axle extending normal to the longitudinal axis of the slot, load carrying wheels journalled on said axle, said frame moving relative to the king bolt in response to movement of the king bolt so as to cause the king bolt to be seated in the forward end of the slot measured in the direction of draft, and means restraining the free pivotal movement of the frame, said means stabilizing the frame and the parts carried thereby.

JOHN B. FELLABAUM.